US012493076B2

(12) United States Patent
Yang et al.

(10) Patent No.: US 12,493,076 B2
(45) Date of Patent: Dec. 9, 2025

(54) SCAN DATA TRANSFER CIRCUITS FOR MULTI-DIE CHIP TESTING

(71) Applicant: Apple Inc., Cupertino, CA (US)

(72) Inventors: Bo Yang, Santa Clara, CA (US); Heon C. Kim, Campbell, CA (US); Vasu P. Ganti, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 18/391,145

(22) Filed: Dec. 20, 2023

(65) Prior Publication Data

US 2025/0093416 A1 Mar. 20, 2025

Related U.S. Application Data

(60) Provisional application No. 63/584,054, filed on Sep. 20, 2023.

(51) Int. Cl.
*G01R 31/3185* (2006.01)
*G01R 31/317* (2006.01)

(52) U.S. Cl.
CPC ........... *G01R 31/318552* (2013.01); *G01R 31/31725* (2013.01); *G01R 31/318536* (2013.01); *G01R 31/318541* (2013.01); *G01R 31/318594* (2013.01)

(58) Field of Classification Search
USPC .................... 714/731, 726, 727, 728, 729
See application file for complete search history.

(56) References Cited

U.S. PATENT DOCUMENTS

| | | | | |
|---|---|---|---|---|
| 7,613,967 B1* | 11/2009 | Tan | ................. | G01R 31/318594 714/731 |
| 7,657,809 B1* | 2/2010 | Bhatia | ............ | G01R 31/318563 714/731 |
| 7,831,877 B2* | 11/2010 | Sul | ................. | G01R 31/318594 714/731 |
| 8,788,896 B2* | 7/2014 | Tekumalla | ..... | G01R 31/318541 714/30 |
| 8,812,921 B2* | 8/2014 | Tekumalla | ..... | G01R 31/318594 714/726 |
| 9,726,723 B2 | 8/2017 | Douskey et al. | | |
| 9,798,352 B1* | 10/2017 | Majumdar | ................ | G06F 1/10 |
| 10,825,745 B1 | 11/2020 | Sinha et al. | | |
| 2004/0015803 A1* | 1/2004 | Huang | .................... | G06F 30/39 716/103 |

(Continued)

*Primary Examiner* — John J Tabone, Jr.
(74) *Attorney, Agent, or Firm* — Kowert, Hood, Munyon, Rankin & Goetzel, P.C.; Scott W. Pape; Dean M. Munyon

(57) ABSTRACT

An apparatus includes a first set of scan-enabled flip-flop circuits may be configured to shift a scan-chain pattern from a first test input node to a first test output node using a first clock signal. A particular lockup latch may be coupled to the first test output node and to a second test input node. This particular lockup latch may be configured to, when enabled, delay propagation of the scan-chain pattern from the first test output node to the second test input node. A second set of scan-enabled flip-flop circuits may be configured to shift the scan-chain pattern from the second test input node to a second test output node using a second clock signal, different from the first clock signal. A control circuit may be configured to determine whether to enable the particular lockup latch using a particular scan test signal.

20 Claims, 8 Drawing Sheets

(56) References Cited

U.S. PATENT DOCUMENTS

| | | | |
|---|---|---|---|
| 2008/0222471 A1* | 9/2008 | Sul .................. | G01R 31/318594 |
| | | | 714/731 |
| 2009/0187801 A1* | 7/2009 | Pandey .......... | G01R 31/318558 |
| | | | 714/729 |
| 2013/0179742 A1* | 7/2013 | Tekumalla ..... | G01R 31/318541 |
| | | | 714/E11.155 |
| 2025/0093416 A1* | 3/2025 | Yang .............. | G01R 31/318536 |

* cited by examiner

400

---

Shifting, through a particular set of scan-enabled flip-flop circuits (scan flops) included in a first clock domain, a scan chain signal from a first test input pin to a first test output node.
410

---

Enabling, at a first point in time, a particular lockup latch to increase a propagation delay of the scan chain signal from the first test output node to a second test input node that is coupled to an input terminal of a given scan flop in a second clock domain.
420

---

Disabling, at a second point in time, the particular lockup latch to decrease the propagation delay of the scan chain signal from the first test output node to the second test input node, wherein the enabling and disabling are performed based on a clock skew between the first clock domain and the second clock domain.
430

Shifting, through a different set of scan flops, including the given scan flop, included in the second clock domain, the scan chain signal from the second test input node to a second test output node.
510

↓

Disabling, at the first point in time, a different lockup latch to decrease a propagation delay of the scan chain signal from the second test output node to a third test input node that is coupled to an input terminal of a different scan flop in the first clock domain.
520

↓

Enabling, at the second point in time, the different lockup latch to increase the propagation delay of the scan chain signal from the second test output node to the third test input node, wherein the enabling and disabling are performed based on the clock skew between the first clock domain and the second clock domain.
530

```
Shifting, through a different set of scan flops, including the given scan flop, included in
the second clock domain, the scan chain signal from the second test input node to a
second test output node.
610
```

↓

```
Enabling, at the first point in time, a different lockup latch to increase a propagation delay
of the scan chain signal from the second test output node to a third test input node that is
coupled to an input terminal of a different scan flop in a third clock domain.
620
```

↓

```
Disabling, at the second point in time, the different lockup latch to decrease the
propagation delay of the scan chain signal from the second test output node to the third
test input node, wherein the enabling and disabling are performed based on a clock skew
between the second clock domain and the third clock domain.
630
```

FIG. 6

SCAN DATA TRANSFER CIRCUITS FOR MULTI-DIE CHIP TESTING

The present application claims priority from U.S. Provisional App. No. 63/584,054, entitled "Scan Data Transfer Circuits for Multi-die Chip Testing," filed Sep. 20, 2023, the disclosure of which is incorporated by reference herein in its entirety.

BACKGROUND

Technical Field

Embodiments described herein are related to computing systems including, for example, systems-on-a-chip (SoCs). More particularly, embodiments are disclosed relating to techniques for using scan chain analysis.

Description of the Related Art

Scan-based diagnosis is a testing technique that may be employed on computer systems that include clocked logic circuits, including computer systems such as systems-on-a-chip (SoCs). The techniques use scan-enabled storage circuits, e.g., flip-flop circuits, coupled into one or more scan chains. One or more scan-chain patterns may then be applied to a test input interface and shifted through the scan chains, until outputs are available at a test output interface. If the scan test output matches an expected output, then the logic circuits included in the scan chains may be functioning properly. In cases where one or more scan outputs deviate from the expected values, one or more logic circuits in the corresponding scan chains may be failing.

Scan testing typically uses a clock signal to sequence a given scan-chain pattern through a set of scan chain flip-flop circuits. In some computer systems, a scan-chain pattern may be sequenced through two sets of scan chain flip-flop circuits in which a first of the sets is clocked by a first clock signal and a second of the sets is clocked by a second clock signal. Output of a particular scan flip-flop in the first set may drive an input of a different scan flip-flop in the second set. Clock skew between the first and second clock signals may result in a timing violation at the input of the different scan flip-flop.

BRIEF DESCRIPTION OF THE DRAWINGS

The following detailed description makes reference to the accompanying drawings, which are now briefly described.

FIG. 4 illustrates a flow diagram of an embodiment of a method for scan testing a system that includes a scan chain that crosses from a first to a second clock domain.

FIG. 5 shows a flow diagram of an embodiment of a method for scan testing a system that includes a scan chain that crosses from the second back to the first clock domain.

FIG. 6 shows a flow diagram of an embodiment of a method for scan testing a system that includes a scan chain that crosses from the second clock domain into a third clock domain.

Figure 1:
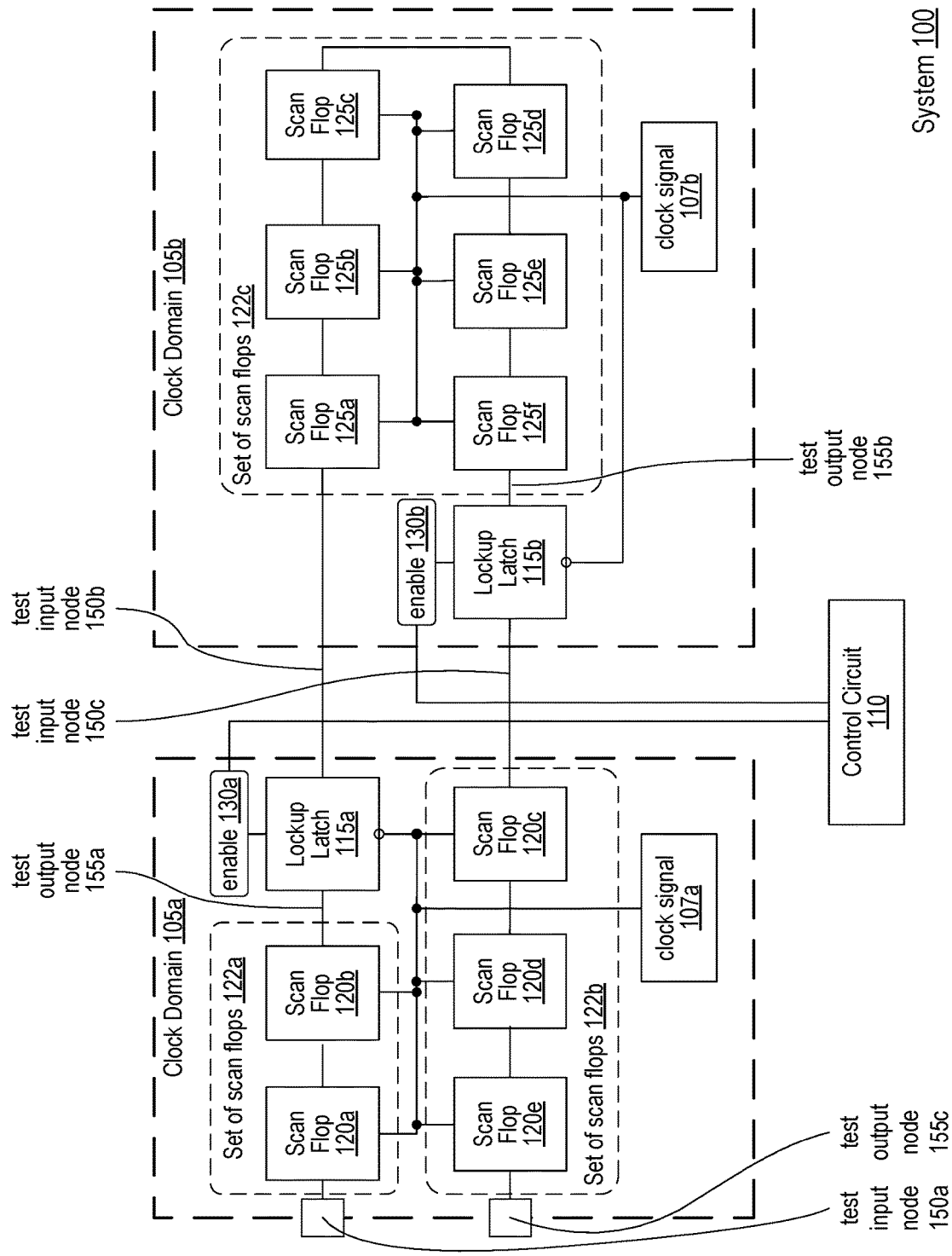
FIG. 1 illustrates a block diagram of an embodiment of a system that includes scan chains with lockup latch circuits.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As disclosed above, scan-based diagnosis is a technique that can be used to identify failing logic circuits in a computer system. Scan testing is commonly used for integrated circuit (IC) testing. A typical scan test technique includes serially shifting, from external test equipment to a scan test input of an IC, pattern bits of a scan-chain pattern comprised of a string of logic highs and lows. Successive scan clock transitions may cause the pattern bits to shift from a scan test input pin of the IC that is coupled to an input of a first scan-enabled storage circuit (e.g., a scan-enabled flip-flop) in the scan chain, through to a next to scan-enabled storage circuit in the chain. When a last scan-enabled storage circuit of the chain is reached, the output of the scan-chain pattern is presented at a scan test output pin of the IC where the external test equipment may receive the scan-chain output pattern and compare it to an expected pattern.

As used herein, a "scan chain" refers to logic circuits, including scan-enabled storage circuits, that are coupled together to propagate one or more scan-chain patterns from an input interface to an output interface. A "scan-chain pattern" refers, herein, to a pattern of logic data (e.g., zeroes and ones) that may be loaded into scan-enabled storage circuits included in a scan chain and shifted out to test functionality of the logic circuits included in the scan chain. A "scan-enabled storage circuit" refers, herein, to a clocked storage element (e.g., a flip-flop circuit) that can be enabled in a scan mode and shift a bit of a scan-chain pattern in response to a particular transition of a scan clock signal.

In some systems, a chip package may include a plurality of IC die, referred to herein as a "multi-die package" or "multi-die chip." In a multi-die chip, only a true subset of the pins of the plurality of included IC die may be conductively coupled to pins of the package. Other pins of the various die may be coupled to pins of other die, thereby allowing the die in the multi-die chip to communicate with one another. Scan chains may, therefore, cross from a scan test output pin of a first die into a scan test input pin of a second die, and may not be accessible outside of the package. A scan-chain pattern, therefore, may pass across one or more die boundaries before reaching a scan test output pin that is conductively coupled to another pin of the package. Clock skew between clock domains in the different IC die may cause timing violations, e.g., setup and hold times at scan-enabled flip-flop circuits coupled to scan test input pins of a given IC die. Even in a single IC die, different logic circuits may have different clock domains which a scan chain crosses, thereby introducing a potential for timing violations.

Novel techniques are disclosed herein which may mitigate at least a portion of clock skew and resulting timing violations. One technique is to enable a path to a scan clock input on each die in a multi-die package. This may allow clock skew between die to be mitigated by intentionally skewing scan clock signals between die to compensate for propagation delay differences within different clock domains. Another technique includes an addition of one or more lockup latch circuits at an end of scan chains within a given clock domain. This may allow clock skew to be shifted between clock domains, thereby making the scan chains more tolerable to propagation delays. Lockup latches, however, may exacerbate issues when a direction of a scan-chain pattern is reversed. For example, if a scan clock for a second die lags a scan clock for a first die, then use of lockup latches may compensate for the delays for patterns propagating from the first die to the second die. If, however, the direction of the scan-chain pattern is reversed to propagate from the second die back to the first die, then the lockup latches may worsen the effect of propagation delays, resulting in improper shifting of the scan-chain pattern from the second die to the first. To compensate, a bypass circuit for lockup latches is proposed. In situations in which a lockup latch is improves scan chain timing, the lockup latch is enabled, otherwise, the lockup latch may be disabled.

The present disclosure considers novel circuits for use in an computer system to implement a technique for identifying shifting a scan-chain pattern through scan chains that cross clock domains. An example apparatus (e.g., an IC) may include a first set of scan-enabled flip-flop circuits that may be configured to shift a scan chain signal from a first test input node to a first test output node using a first clock signal. The apparatus may further include a particular lockup latch coupled to the first test output node and to a second test input node. The particular lockup latch may be configured to, when enabled, delay propagation of the scan chain signal from the first test output node to the second test input node. The example apparatus may also include a second set of scan-enabled flip-flop circuits that may be configured to shift the scan chain signal from the second test input node to a second test output node using a second clock signal, different from the first clock signal. In addition, the apparatus may include a control circuit that may be configured to determine whether to enable the particular lockup latch using a particular scan test signal. Selective use of these lockup latches may help to mitigate timing skew between multiple clock domains, thereby enabling a scan-chain pattern to properly shift through a scan chain that crosses one or more clock domain borders.

FIG. 1 illustrates a block diagram of an embodiment of a system that uses lockup latch circuits to adjust timing of scan-chain patterns through a scan chain that crosses clock domains. System 100 includes two pluralities of scan-enabled flip-flop circuits (scan flops). Scan flops 120a-120e (collectively 120) are located in clock domain 105a and scan flops 125a-125f (collectively 125) are located in clock domain 105b. Scan flops 120a and 120b form set of scan flops 122a, scan flops 120c-120e form set of scan flops 122b, and scan flops 125 are also referred to as set of scan flops 122c. System 100 further includes lockup latch 115a in clock domain 105a and lockup latch 115b in clock domain 105b. A control circuit 110 asserts enable signals 130a and 130b, independently to enable lockup latches 115a and 115b, respectively. Clock signal 107a is provided to scan flops 120 while clock signal 107b is provided to scan flops 125. System 100 includes test input node 150a for receiving scan-chain pattern input and test output node 155c on which scan-chain pattern output is asserted. System 100 may be, in whole or in part, a computing system, such as a desktop or laptop computer, a smartphone, a tablet computer, a wearable smart device, or the like. In some embodiments, system 100 is a single IC, such as a system-on-chip, or a multi-die chip.

As shown, system 100 is configured to receive a scan-chain pattern via test input node 150a. For example, a testing circuit (not illustrated) may be used to generate and assert a serial pattern of logic levels, corresponding to the scan-chain pattern, on test input node 150a. Set of scan flops 122a is configured to shift the scan-chain pattern from test input node 150a to test output node 155a using clock signal 107a. Lockup latch 115a is coupled to test output node 155a and to test input node 150b that crosses into clock domain 105b. Lockup latch 115a is configured to, when enabled, delay propagation of the scan-chain pattern from test output node 155a to test input node 150b. For example, lockup latch 115a may be a flip-flop circuit similar to scan flops 120, but clocked using a different edge of clock signal 107a. In some embodiments, scan flops 120 may be clocked on a rising edge of clock signal 107a and lockup latch 115a clocked on a falling edge of clock signal 107a. Accordingly, if clock signal 107a has a 50% duty cycle, then lockup latch 115a may delay propagation of the scan-chain pattern by one-half of a cycle of clock signal 107a.

Set of scan flops 122c, as illustrated, may be configured to shift the scan-chain pattern from test input node 150b to test output node 155b using clock signal 107b. Clock signal 107b may be different from clock signal 107a. While clock signals 107a and 107b may have a similar frequency, there may be clock skew between the two clock signals 107a and 107b, such that scan flops 120 latch data at a different point in time than scan flops 125. Clock signals 107a and 107b may, in some embodiments, originate from a same clock source, but may travel different paths that insert different propagation delays such that when arriving at scan flops 120 and 125, respectively, an amount of clock skew occurs that would result in timing violations when the scan-chain pattern crosses the boundary between clock domains 105a and 105b. In other embodiments, clock signals 107a and 107b may be generated from different clock source circuits that are independent from one another.

As illustrated, lockup latch 115b is coupled to test output node 155b and to test input node 150c. In a manner similar to lockup latch 115a, lockup latch 115b may be configured to, when enabled, delay propagation of the scan-chain pattern from test output node 155b to test input node 150c, which crosses a boundary back into clock domain 105a. Set of scan flops 122b may be configured to further shift the scan-chain pattern from test input node 150c to test output node 155c using clock signal 107a. The testing circuit may receive the scan-chain pattern from test output node 155c and, for example, compare the receive pattern to an expected pattern to determine whether system 100 passed.

Control circuit 110, as shown, may be configured to determine whether to enable lockup latch 115a using a particular scan test signal, e.g., a test signal generated by the testing circuit. In other embodiments, control circuit 110 may include logic to compare clock signals 107a and 107b, and use the comparison for making the determination. Control circuit 110 may be further configured to determine whether to different lockup latch 115b using the particular scan test signal, or a different signal, from the testing circuit. As with lockup latch 115a, control circuit 110 may also, in other embodiments, be configured to make the determination without a signal form the testing circuit.

Furthermore, control circuit 110 may be configured to prevent lockup latch 115a and lockup latch 115b from being enabled concurrently. For example, if clock signal 107a transitions earlier than clock signal 107b, lockup latch 115a may be enabled to delay propagation of the scan-chain pattern when shifting from clock domain 105a to clock domain 105b. When the scan-chain pattern is shifted back into clock domain 105a from clock domain 105b, a propagation delay may not be desired since clock signal 107b is already delayed in comparison to clock signal 107a. Adding further delay via lockup latch 115b may then violate timing requirements, resulting in scan flop 120c capturing incorrect values of the scan-chain pattern on test input node 150c. Accordingly, when lockup latch 115a is enabled, it may be desired to disable lockup latch 115b, and vice versa.

In some embodiments, system 100 is included in an encapsulating package, e.g., as one or more SoC die in a molded plastic package. In such an embodiment, test input node 150a and test output node 155c may be coupled to respective pins of the encapsulating package. Test input nodes 150b and 150c, as well as test output nodes 155a and 155b may not be electrically coupled to pins of the encapsulating package. As used herein, "electrically coupled" refers to a path from the node to the package pin with no circuitry that alters a logic state of signals passing between the package pins and test input node 150a and test output node 155c. In some embodiments, an input driver circuit may be included between a package pin and test input node 150a and an output driver circuit may be included between test output node 155c and a corresponding package pin. In such embodiments, a logic state of the package pins and the respective test input node 150a and test output node 155c may remain consistent. In some embodiments, clock signals 107a and 107b may also be electrically coupled to pins of the encapsulating package. Accordingly, in such embodiments, test input node 150a, clock signals 107a and 107b may be driven directly by the testing circuit via the respective pins of the encapsulating package, and logic states of test output node 155c may similarly be observed directly by the testing circuit.

It is noted that system 100, as illustrated in FIG. 1, is merely an example. System 100 has been simplified to highlight features relevant to this disclosure. Elements not used to describe the details of the disclosed concepts have been omitted. For example, system 100 may include various circuits that are not illustrated, such as one or more processor circuits, memory management circuits, memory circuits, and the like. Only one scan chain is illustrated with an included eleven scan flops 120 and 125, and two lockup latches 115. In other embodiments, any suitable number of scan chains may be included, and each scan chain may be comprised of any suitable number of elements, including, e.g., logic elements that are not illustrated. In various embodiments, circuits of system 100 may be implemented using any suitable combination of sequential and combinatorial logic circuits. In addition, register and/or memory circuits, such as static random-access memory (SRAM) may be used in these circuits to temporarily hold information such as instructions, data, address values, and the like.

Figure 2:
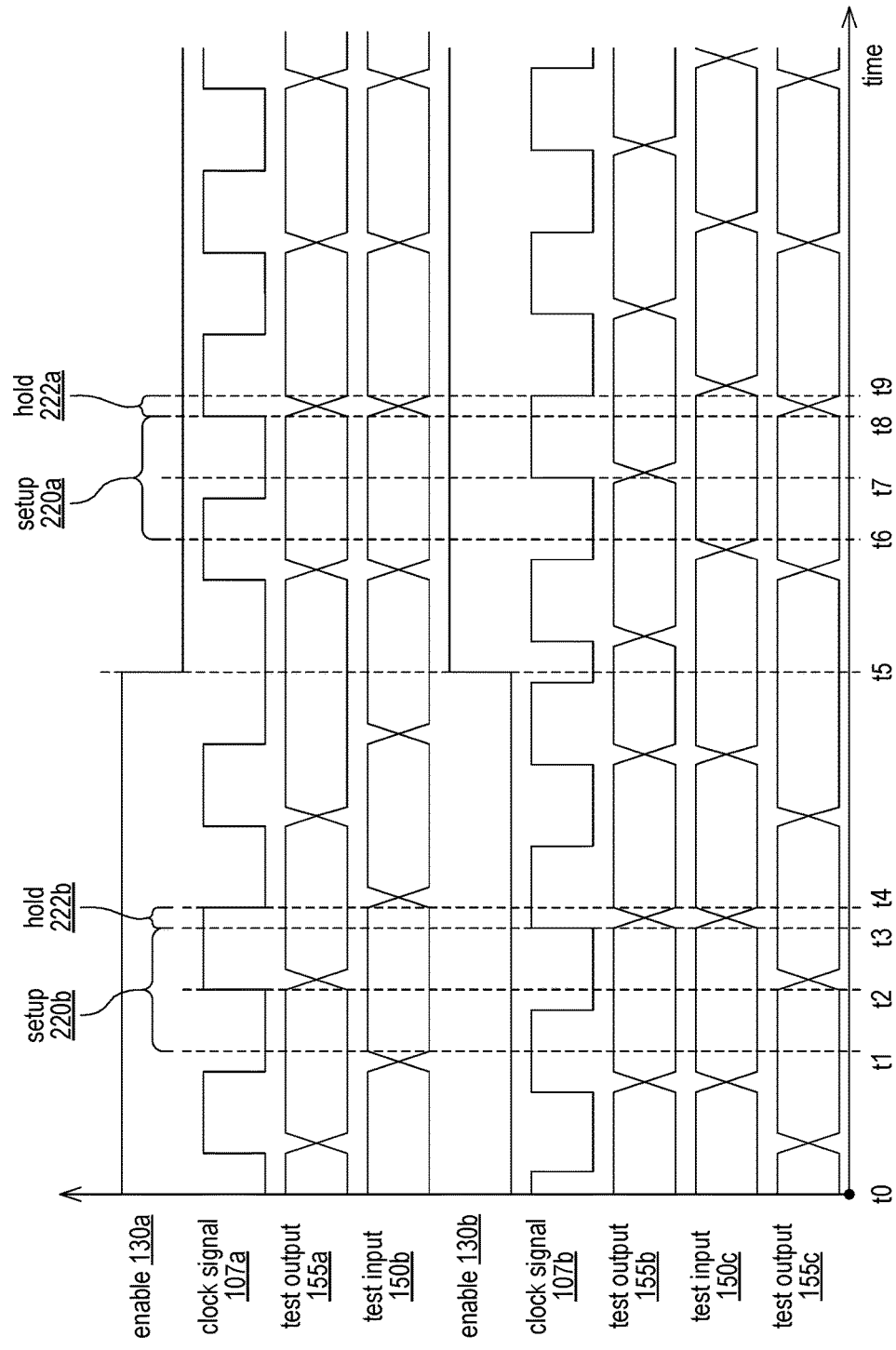
FIG. 2 shows a timing diagram of signals associated with the system of FIG. 1.

In FIG. 1, a scan chain that utilizes lockup latches for crossing clock domains is disclosed. Benefits of using lockup latches may be understood in view of scan operation. FIG. 2 depicts an example of scan-chain pattern data passing through respective lockup latches.

Moving to FIG. 2, a chart depicting several signals associated with a scan-chain pattern passing through two different lockup latches is shown. As shown, chart 200 depicts examples of logic levels versus time for nine elements of system 100 in FIG. 1. Included are enable signals 130a and 130b, clock signals 107a and 107b, test output nodes 155a-155c, and test input nodes 150b and 150c. In the illustrated example, scan flops 120 and, when disabled, lockup latch 115a capture data at their respective inputs in response to a rising edge of clock signal 107a. When enabled, lockup latch 115a captures data at its input in response to a falling edge of clock signal 107a. In a similar manner, scan flops 125 and, when disabled, lockup latch 115b capture data at their respective inputs in response to a rising edge of clock signal 107b, and, when enabled, lockup latch 115b captures data at its input in response to a falling edge of clock signal 107b.

As illustrated at time t0, clock signal 107b lags behind clock signal 107a by just less than half of a clock cycle. To compensate for this lag, enable 130a is asserted while enable signal 130b is de-asserted, resulting in lockup latch 115a delaying propagation of a scan-chain pattern from test output node 155a to test input node 150b. Lockup latch 115b is, in contrast, disabled and, therefore, not introducing additional delay between test output node 155b and test input node 150c. Lockup latches 115 are further configured to, when enabled, delay propagation of the scan-chain pattern for less than one clock cycle. In the illustrated example, the delay time is one-half of a clock cycle. This delay time, however, may depend on a duty cycle of the clock signals 107. In the present example, shorter duty cycles result in shorter propagation delays and vice versa. In other embodiments, this may be reversed.

At time t1, lockup latch has just captured a scan-chain pattern bit on test output node 155a (corresponding to an output of set of scan flops 122a and an input to lockup latch 115a) and has updated test input node 150b (corresponding to an output of lockup latch 115a) with the value of this pattern bit. Test input node 150b corresponds to an input of scan flop 125a, a first flop of set of scan flops 122c. At time t3, a rising edge of clock signal 107b causes set of scan flops 122c to shift, resulting in scan flop 125a capturing the scan-chain pattern bit on test input node 150b, and set of scan flops 122c shifting a bit of the scan-chain pattern onto test output node 155b. Since enable signal 130b is de-asserted, lockup latch 115b is bypassed and test input node 150c has a same bit value as test output node 155b.

Since test input node 150c is the input to set of scan flops 122b, in clock domain 105a, scan flop 120c captures a scan-chain pattern bit from test input node 150c prior to the change to the subsequent pattern bit at time t3. If lockup latch 115b were enabled, then the pattern pin on test input node 150c would be delayed for one-half of a clock cycle of clock signal 107b. This would place the signal transition on test input node 150c very close to time t2, and possibly violate a setup time for scan flop 120c. With lockup latch 115b disabled, test input node 150c has settled with the proper scan-chain pattern bit value with plenty of setup time.

At time t4, a falling edge on clock signal 107a causes lockup latch 115a to capture a next scan-chain pattern bit on test output node 155a which is then presented at test input node 150b. Setup time 220b and hold time 222b are indicated in chart 200 for scan flop 125a. As can be seen, delaying propagation, by lockup latch 115a results in a setup time 220b that is much larger than hold time 222b. For a typical scan flip-flop circuit, this may be a desired condition. As scan flops 125 shift the scan-chain pattern bits on a same clock edge, the input to each subsequent scan flop 125 in set of scan flops 122c may change almost immediately after the clock edge. Accordingly, to properly shift the scan-chain pattern bits, scan flops 125 (and similarly, scan flops 120)

cannot have long hold times as the input to a scan flop only remains valid after the clock edge for a rise or fall time of the previous scan flop.

At time t5 clock signals 107a and 107b are adjusted, resulting in clock signal 107a now lagging just under one-half clock cycle from clock signal 107b. For example, a testing circuit coupled to system 100 and performing the scan test, may cause, directly or indirectly, the adjustments to clock signals 107a and 107b. In response to the change in clock signals 107a and 107b, enable signals 130a and 130b are reversed, causing lockup latch 115a to be disabled and lockup latch 115b to be enabled. As a result, test input node 150b now has a same value as test output node 155a, while test input node 150c is now delayed one-half cycle of clock signal 107b from test output node 155b.

With no delay between test input node 150b and test output node 155a, scan flop 125a captures a scan-chain pattern bit at time t7. As can be seen in FIG. 2, if test input node 150b were delayed by one-half of a cycle of clock signal 107a, then a setup timing violation may occur. Without the delay, there is adequate setup and hold time. Also at time t7, set of scan flops 122c shift scan-chain pattern bits, thereby placing a next pattern bit on test output node 155b. Since lockup latch 115b is enabled, propagation of this next pattern bit is delayed to test input node 150c. Subsequently, at time t8, scan flop 120c is able to capture a current pattern bit from test input node 150c rather than improperly capturing the next pattern bit. At time t9, lockup latch 115b captures the next pattern bit from test output node 155b and updates test input node 150c after scan flop 120c has had a chance to capture the previous pattern bit. Setup time 220a and hold time 222a are shown for scan flop 120c. As described above, setup time 220a is much greater than hold time 222a, creating a desired timing condition.

By using lockup latches 115, scan flops 120 and 125 may be designed with desired timing characteristics, including hold times that may approach zero. Selectable lockup latches 115 allow scan chains to cross clock domains even when the clock signals for each domain are configured for varying degrees of clock skew. This flexibility may, in some embodiments, improve a testability and/or test coverage for system 100, thereby resulting in an increased degree of quality and/or reliability.

It is noted that the signals depicted in chart 200 of FIG. 2 are simplified for clarity. In other embodiments, actual signals measured at the indicated nodes may include varying degrees of ringing on signal transitions. Only signals needed to demonstrate the disclosed techniques are shown, and other signals that may contribute to the proper operation of system 100 have been omitted.

FIGS. 1 and 2 depict a system with a scan chain spanning two clock domains. The disclosed techniques, however, may be utilized in systems with scan chains crossing more than two clock domains, and may include crossing die boundaries. For example, some embodiments of the disclosed system may be implemented using one or more SoC die. It is to be understood that any disclosed SoC can also be implemented using a chiplet-based architecture. Accordingly, wherever the term "SoC" appears in this disclosure, those references are intended to also suggest embodiments in which the same functionality is implemented via a less monolithic architecture, such as via multiple chiplets, which may be included in a single package in some embodiments.

On a related note, such multi-die embodiments are to be understood to encompass both homogeneous designs (in which each SoC includes identical or almost identical functionality) and heterogeneous designs (in which the functionality of each SoC diverges more considerably). Such disclosure also contemplates embodiments in which the functionality of the multiple SoCs is implemented using different levels of discreteness. For example, the functionality of a first system could be implemented on a single IC, while the functionality of a second system (which could be the same or different than the first system) could be implemented using a number of co-packaged chiplets. An example of a multi-die embodiment is illustrated in FIG. 3.

Figure 3:
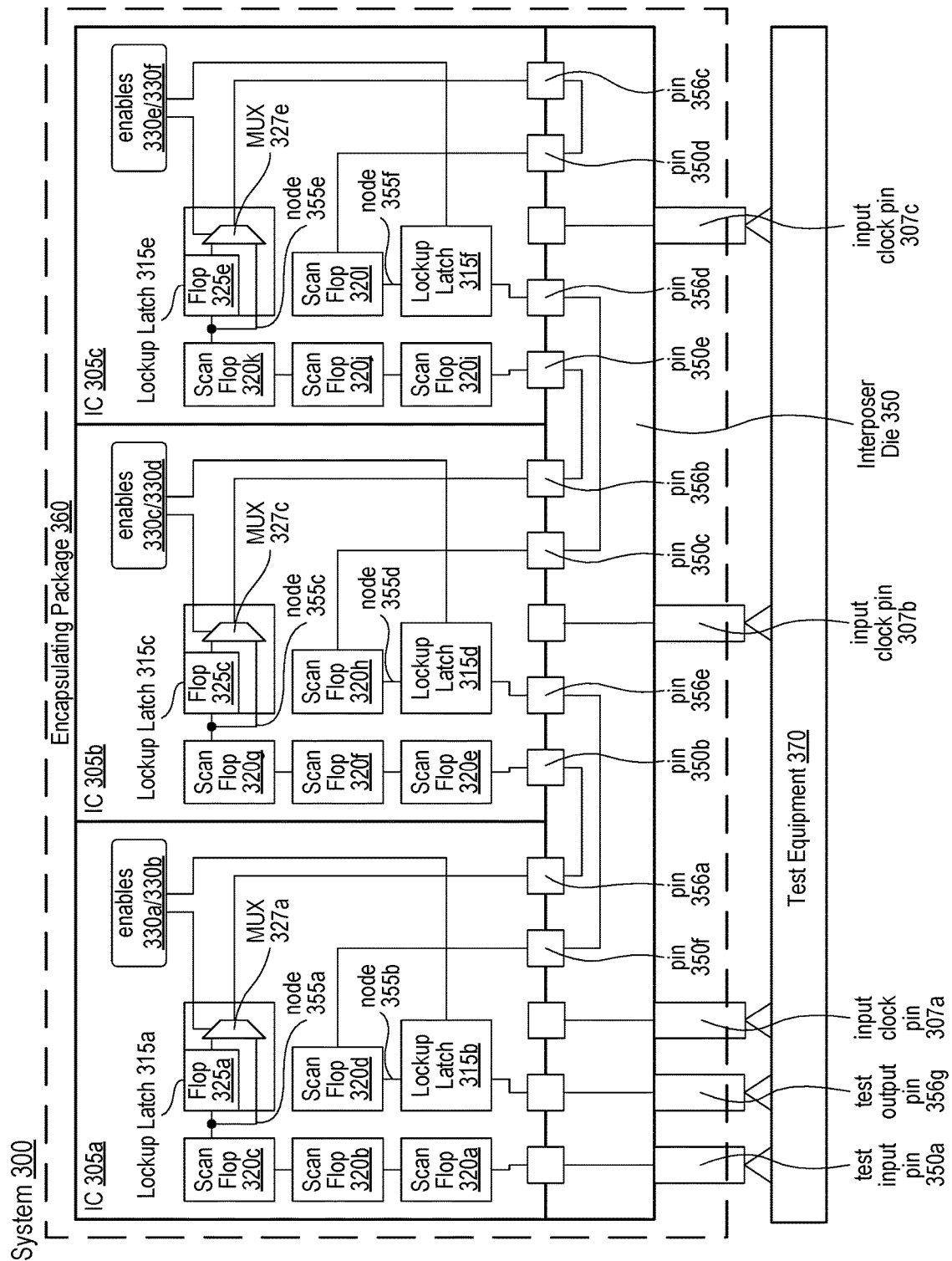
FIG. 3 depicts a block diagram of a multi-die system in which a scan chain crosses die boundaries.

Continuing to FIG. 3, a block diagram of an embodiment of a multi-die chip in which the multiple dies include respective lockup latches is shown. As illustrated, system 300 includes integrated circuits (ICs) 305a-305c (collectively 305). ICs 305 each include a respective portion of scan-enabled flip-flop circuits (scan flops) 320a-320l (collectively 320), as well as a respective two of lockup latches 315a-315f (collectively 315). In various embodiments, ICs 305 may be heterogeneous, homogeneous, or a combination thereof. For example, ICs 305b and 305c may be SoCs (of either a same or different design) while IC 305a may be a chiplet that provides additional functionality to ICs 305b and 305c. ICs 305 are coupled to one another via interposer die 350. ICs 305 are tested using test equipment 370.

As illustrated, IC 305a includes scan flops 320a-320c that are configured to shift a scan-chain pattern from test input pin 350a to test output node 355a, as well as scan flop 320d that is configured to shift the scan-chain pattern from test input pin 350f to test output node 355b. Although connections are not shown for clarity, input clock pin 307a is coupled to ones of scan flops 320a-320d. Lockup latch 315a is coupled to the test output node 355a and to test output pin 356a. Lockup latch 315b is coupled to the test output node 355b and to test output pin 356g.

IC 305b includes scan flops 320e-320g that are configured to shift the scan-chain pattern from test input pin 350b to test output node 355c, as well as scan flop 320h that is configured to shift the scan-chain pattern from test input pin 350c to test output node 355d. Input clock pin 307b is coupled to ones of scan flops 320e-320h. Lockup latch 315c is coupled to the test output node 355c and to test output pin 356b. Lockup latch 315d is coupled to the test output node 355d and to test output pin 356e. When enabled, lockup latches 315c and 315d are configured to delay propagation of the scan-chain pattern from their respective test output nodes to their respective test output pins.

IC 305c includes scan flops 320i-320k that are configured to shift the scan-chain pattern from test input pin 350e to test output node 355e, as well as scan flops 320l that is configured to shift the scan-chain pattern from test input pin 350d to test output node 355f. Input clock pin 307c is coupled to ones of scan flops 320i-320l. Lockup latch 315e is coupled to the test output node 355e and to test output pin 356c. Similarly, lockup latch 315f is coupled to the test output node 355f and to test output pin 356d. When enabled, lockup latches 315e and 315f are, similar to lockup latches 315a-315d, configured to delay propagation of the scan-chain pattern to the respective test output pins.

As shown, ICs 305 are coupled by interposer die 350. Test output pin 356a and test input pin 350f of IC 305a are electrically coupled, via conductive traces on interposer die 350, to test input pin 350b and test output pin 356e of IC 305b. Similarly, test output pin 356b and test input pin 350c of IC 305b are electrically coupled, via conductive traces on interposer die 350, to test input pin 350e and test output pin 356d of IC 305c. In the illustrated embodiment, IC 305c is a last die of the three ICs, so test output pin 356c is coupled to test input pin 350d, via conductive traces on interposer die 350. In addition to the illustrated connections between ICs 305, additional connections may be included between any combination of the three ICs 305, allowing for example, ICs 305 to operate as a single SoC.

Lockup latches 315 are configured to, when enabled, delay propagation of the scan-chain pattern from a respective latch input terminal to a respective latch output terminal. When disabled, lockup latches 315 are configured to allow the scan-chain pattern to propagate from the respective latch input terminal to the respective latch output terminal without a significant delay. Each of ICs 305 include a respective set of enable signals 330 to independently enable or disable each respective lockup latch 315. Each of lockup latches 315 include a respective latching circuit (e.g., flops 325a, 325c, and 325e) and a multiplexing circuit (e.g., MUX 327a, 327c, and 327e). Although omitted for clarity, lockup latches 315b, 315d, and 315f may include similar circuits.

To enable a given lockup latch (e.g., lockup latch 315a), a control circuit is configured to select a first input of MUX 327a that is coupled to flop 325a. To disable lockup latch 315a, this control circuit is configured to select a second input of MUX 327a that is coupled to test output node 355a. Flops 325 may use any suitable latching circuit, such as a D-type flip-flop circuit. Such flops 325 may be clocked with a clock signal in the respective IC 305 in which they reside, e.g., a signal from one of input clock pins 307. Flops 325, however, may be activated by a different edge of the respective clock source that scan flops 320. In IC 305a, for example, scan flops 320 may be activated by a rising edge of a signal on input clock pin 307a and flop 325a is activated by a falling edge of the same signal. As shown and described above in regards to FIG. 2, this may result in delaying propagation of the scan-chain pattern by less than one cycle of the signal, e.g., one-half of a clock cycle when the clock signal has a 50% duty cycle.

IC 305c and interposer die 350 are included in encapsulating package 360. Encapsulating package 360 may be comprised of any suitable type of semiconductor package technology, such as a lead-frame enclosed in plastic mold compound, a circuit board enclosed in resin, a ceramic package with integrated lead-frame, and the like. Encapsulating package 360 includes a conductive traces from test output pin 356g, test input pin 350a, and input clock pins 307a-307c to respective package pins, such that these pins may be accessed external to encapsulating package 360. The remaining pins illustrated in FIG. 3 are not coupled to pins of encapsulating package 360 and therefore, are not directly accessible by test equipment 370.

Test equipment 370, as shown, may be used to perform scan tests on ICs 305. Any suitable type of test circuits may be included in test equipment 370. For example, test equipment 370 may include automated test equipment (ATE) that may be used to perform production tests on a high volume of ICs 305, or may include various pieces of lab equipment, and the like.

Scan flops 320 may, when coupled as illustrated in FIG. 3, combine to form one scan chain. Since each of ICs 305 includes a respective one of input clock pins 307a, 307b, and 307c, each of ICs 305 may be represent a different clock domain. Accordingly, lockup latches 315 are coupled to test output pins of the respective ICs 305 to delay, when advantageous, the scan-chain pattern from crossing die boundaries. As described above in regards to FIG. 2, delaying the scan-chain pattern when crossing clock domains (e.g., die boundaries) may help to avoid setup timing violations for a first scan flop 320 in the subsequent IC 305.

As disclosed, enable signals 330 may be asserted independently to enable or disable each respective lockup latch 315. Test equipment 370 may include a control circuit for determining which, if any, of enable signals 330 to assert. For example, test equipment 370 may have a capability to provide a respective clock signal on each of input clock pins 307 for each of ICs 305. Accordingly, test equipment 370 may vary clock skew between the three clock signals to test various aspects of the operation of each of ICs 305. Although test equipment 370 only has access to test input pin 350a and test output pin 356g for testing all of scan flops 320 (and circuits associated with these scan flops 320), use of one of more scan-chain patterns combined with adjustment of the relative skew between clock signals applied to each of input clock pins 307 may allow test equipment 370 to sufficiently test the circuitry associated with scan flops 320 across all three ICs 305.

In some embodiments, IC 305a may include a particular control circuit configured to determine whether to enable lockup latches 315a and/or 315b, e.g., based on a clock skew between respective clock signals on input clock pins 307a and 307b. This control circuit may perform the determine with or without additional input from test equipment 370. For example, test equipment 370 may send, e.g., via test input pin 350a, one or more commands to assert either of enable signals 330a and 330b. In other embodiments, the particular control circuit may include logic for determining a clock skew between signals on input clock pins 307a and 307b without commands from test equipment 370.

IC 305b may, in some embodiments, also include a different control circuit configured to determine whether to enable lockup latch 315d based on the clock skew between the respective clock signals on input clock pins 307a and 307b. Lockup latches 315a and 315d may not be enabled concurrently in some embodiments. This different control circuit may also be configured to determine whether to enable lockup latch 315c based on the clock skew between the respective clock signals on input clock pins 307b and 307c. As with the particular control circuit, this different control circuit may have a capability determining a clock skew between signals on input clock pins 307a, 307b and 307c with, or without, commands from test equipment 370. In other embodiments, the particular control circuit in IC 305a may be capable of asserting any of enable signals 330 across each of ICs 305.

It is noted that the multi-die embodiment of FIG. 3 is merely an example. Although three die are illustrated in the encapsulating package, any suitable number of dies may be included, and use of selectable lockup latches may allow a scan-chain pattern to cross one or more die boundaries and return back to an original die without encountering timing violations due to the die boundary crossings. Only elements necessary to demonstrate the disclosed concepts have been depicted. In other embodiments, any suitable number of pins, scan flops, lockup latches may be included, as well as other circuits that are not illustrated.

To summarize, various embodiments of a system that utilizes a selectable lockup latch circuit are disclosed. In an example apparatus, a first set of scan-enabled flip-flop circuits may be configured to shift a scan-chain pattern from a first test input node to a first test output node using a first clock signal. A particular lockup latch may be coupled to the first test output node and to a second test input node. This particular lockup latch may be configured to, when enabled, delay propagation of the scan-chain pattern from the first test output node to the second test input node. A second set of scan-enabled flip-flop circuits may be configured to shift the scan-chain pattern from the second test input node to a second test output node using a second clock signal, different from the first clock signal. A control circuit may be configured to determine whether to enable the particular lockup latch using a particular scan test signal.

In a further example, a different lockup latch may be coupled to the second test output node and to a third test input node. This different lockup latch may be configured to, when enabled, delay propagation of the scan-chain pattern from the second test output node to the third test input node.

In another example, the control circuit may be further configured to determine whether to enable the different lockup latch using the particular scan test signal. prevent the particular lockup latch and the different lockup latch from being enabled concurrently. In an example, a third set of scan-enabled flip-flop circuits may be configured to shift the scan-chain pattern from the third test input node to a third test output node using the first clock signal.

In a further example, the apparatus may include an encapsulating package, wherein the first test input node and the third test output node are coupled to respective pins of the encapsulating package. The second and third test input nodes and the first and second test output nodes may not be coupled to pins of the encapsulating package.

In an example, the first and second clock signals may be received from respective pins of the encapsulating package. In another example, the particular lockup latch may be further configured to, when enabled, delay propagation of the scan-chain pattern for less than one clock cycle.

In an embodiment, the particular lockup latch may include a latching circuit and a multiplexing circuit. To enable the particular lockup latch, the control circuit may be configured to select a first input of the multiplexing circuit that is coupled to the latching circuit. To disable the particular lockup latch, the control circuit may be configured to select a second input of the multiplexing circuit that is coupled to the first test output node.

The circuits and techniques described above in regards to FIGS. 1-3 may be performed using a variety of methods. Three methods associated with using selectable lockup latch circuits are described below in regards to FIGS. 4-6.

Turning now to FIG. 4, a flow diagram for an embodiment of a method for performing a scan test using a one or more selectable lockup latch circuits is illustrated. Method 400 may be performed by any of the systems disclosed herein, such as systems 100 and 300 of FIGS. 1 and 3. In some embodiments, some or all of the operations of method 400 may be performed using instructions included in a non-transient, computer-readable memory having program, the instructions being executable by processor circuits in the systems to cause the operations described with reference to FIG. 4. Method 400 is described below using system 300 of FIG. 3 as an example. References to elements in FIG. 3 are included as non-limiting examples.

At 410, method 400 begins by shifting, through a particular set of scan-enabled flip-flop circuits included in a first clock domain of a circuit, a scan-chain pattern from a first test input pin to a first test output node. For example, test equipment 370 may supply the scan-chain pattern to test input pin 350s, a first clock signal to input clock pin 307a, and a second clock signal to input clock pin 307b. The scan-chain pattern may be shifted through scan flops 320a-320c in response to successive falling edges of the first clock signal, with a bit of the scan-chain pattern progress through the chain of scan flops 320a-320c in response to each successive falling edge.

Method 400 continues at 420 by enabling, at a first point in time, a particular lockup latch to increase a propagation delay of the scan-chain pattern from the first test output node to a second test input node that is coupled to an input terminal of a given scan-enabled flip-flop circuit in a second clock domain of the circuit. The increase in the propagation delay of the scan-chain pattern through the particular lockup latch when enabled may be less than one clock cycle of the first clock signal. For example, enable signal 330a, when asserted, may cause MUX 327a to select a first input terminal coupled to an output of flop 325a as an output signal. Flop 325a, in the illustrated embodiment, shifts-in a particular scan-chain pattern bit held by scan flop 320c on a rising edge of the first clock signal. Since scan flop 320c shifts-in the particular scan-chain pattern bit in response to a falling edge of the first clock signal, the increase in the propagation delay is based on the duty cycle of the first clock signal. Lockup latch 315a drives a captured bit value onto test output pin 356a.

At 430 method 400 proceeds with disabling, at a second point in time, the particular lockup latch to decrease the propagation delay of the scan-chain pattern from the first test output node to the second test input node. For example, enable signal 330a is de-asserted at the second point in time, thereby causing MUX 327a to select a second input terminal coupled to the output of scan flop 320c, as an output signal. By bypassing flop 325a, a delay through lockup latch 315a may be reduced to simply a delay of the pattern bit passing through logic circuits of MUX 327a. Accordingly, the output of scan flop 320c may be considered to be coupled to test output pin 356a when lockup latch 315a is disabled.

The enabling and disabling of lockup latch 315a may be performed based on a clock skew between the first clock signal and the second clock signal, such as described above, e.g., in regards to FIG. 2. Lockup latch 315a may be enabled to increase a setup time for scan flop 320e in IC 305b if the second clock signal lags behind the first clock signal by a threshold amount of time. As described above, enable signal 330a may be asserted by test equipment 370, by a control circuit in IC 305a, or a combination thereof.

It is noted that the method of FIG. 4 includes blocks 410-430. Method 400 may end in block 430 or may repeat some or all blocks of the method. For example, method 400 may repeat block 410 repeatedly to shift a scan-chain pattern through scan flops 320 after enable signal 330a has been either asserted or de-asserted.

Proceeding now to FIG. 5, a flow diagram for an embodiment of a method for performing a scan test using a plurality of lockup latch circuits is illustrated. Similar to method 400, method 500 may be used in conjunction with any of the systems disclosed herein, such as systems 100 and 300. Some or all of the operations of method 500 may, in some embodiments, be performed using instructions stored in a non-transient, computer-readable memory that are executable by ones of systems 100 and 300 cause the operations described with reference to FIG. 5. Method 500 is described below using system 300 of FIG. 3 as an example. References to elements in FIG. 3 are included as non-limiting examples. As illustrated, method 500 may be performed concurrently with method 400.

Method 500 begins in 510 by shifting, through a different set of scan-enabled flip-flop circuits, including the given scan-enabled flip-flop circuit included in the second clock domain, the scan-chain pattern from the second test input node to a second test output node. For example, the scan-chain pattern disclosed in regards to FIG. 4 may be shifted through scan flops 320a-320c of IC 305a and into scan flops 320*e*-320*g* of IC 305*b*. Since scan flops 320*a*-320*c* are clocked by a signal on input clock pin 307*a* and scan flops 320*e*-320*g* are clocked by a signal on input clock pin 307*b*, the scan chain crosses a clock domain boundary from IC 305*a* to IC 305*b*. Lockup latch 315*a*, when enabled at the first time, may delay propagation of bits of the scan-chain pattern from test output node 355*a* to test output pin 356*a* by, e.g., one-half of a clock cycle of a signal on input clock pin 307*a*. This delay may help to avoid a setup timing violation when bits of the scan-chain pattern shift from scan flop 320*c* to scan flop 320*e*. At the second point in time, lockup latch 315*a* is disabled, allowing the output of scan flop 320*c* to propagate scan flop 320*e* without adding a significant delay.

As illustrated in FIG. 3, the scan-chain pattern may be shifted from scan flop 320*g* to scan flops 320*i*-320*l*, crossing into a third clock domain at the die boundary between IC 305*b* and IC 305*c*, and returning back into the clock domain of IC 305*b* at test input pin 350*c*. The scan-chain pattern is shifted through scan flop 320*h* to test output node 355*d*.

At 520, method 500 proceeds by disabling, at the first point in time, a different lockup latch to reduce a propagation delay of the scan-chain pattern from the second test output node to a third test input node that is coupled to an input terminal of a given scan-enabled flip-flop circuit in the first clock domain. IC 305*b* includes lockup latch 315*d*, coupled between test output node 355*d* and test output pin 356*e*. At the first point in time, lockup latch 315*a* is, as described above, enabled to delay propagation of the scan-chain pattern from IC 305*a* to IC 305*b*. This enabling of lockup latch 315*a* may be based on a clock skew between clock signals on input clock pins 307*a* and 307*b*. If adding a delay going from IC 305*a* to IC 305*b* helps to prevent a setup timing violation, then adding another such delay going from IC 305*b* back to IC 305*a* may cause a setup timing violation since the signal on input clock pin 307*b* may lag the signal on input clock pin 307*a*. Accordingly, when lockup latch 315*a* is enabled at the first time, lockup latch 315*d* may be disabled by de-asserting enable signal 330*d*.

Method 500 continues at 530 with enabling, at the second point in time, a different lockup latch to reduce a propagation delay of the scan-chain pattern from the second test output node to a third test input node that is coupled to an input terminal of a given scan-enabled flip-flop circuit in the first clock domain. As described in regards to method 400 above, lockup latch 315*a* is disabled at the second point in time. This disabling may be due to the signal on input clock pin 307*a* lagging the signal on input clock pin 307*b*. Based on an amount of this lag, lockup latch 315*d* may be enabled, via an assertion of enable signal 330*d*, at the second point in time to help to prevent a setup timing violation of the scan-chain pattern as it propagates back into the clock domain of IC 305*a* from the clock domain of IC 305*b*.

As described above, test equipment 370 may generate or otherwise cause signals on input clock pins 307*a* and 307*b* to be set to various frequencies and/or phase shifts at different points in time. These variations may enable a desired level of test coverage when ICs 305 are under test. The selective enabling of lockup latches 315 may contribute to the testability of ICs 305.

It is noted that method 500 includes blocks 510-530. Method 500 may end in block 530 or may repeat some or all blocks of the method. For example, method 500 may repeat 510 repeatedly to shift a scan-chain pattern through scan flops 320 after enable signal 330*d* has been either asserted or de-asserted. As stated above, methods 400 and 500 may be performed concurrently.

Proceeding now to FIG. 6, a flow diagram for another embodiment of a method for performing a scan test using a plurality of lockup latch circuits is illustrated. Similar to methods 400 and 500, method 600 may be used in conjunction with any of the systems disclosed herein, such as systems 100 and 300. Some or all of the operations of method 600 may, in some embodiments, be performed using instructions stored in a non-transient, computer-readable memory that are executable by ones of systems 100 and 300 to cause the operations described with reference to FIG. 6. Method 600 is described below using system 300 of FIG. 3 as an example. References to elements in FIG. 3 are included as non-limiting examples. As depicted, method 600 may be performed concurrently with methods 400 and 500.

Method 600 begins in 610 with, shifting, through a different set of scan flops, including the given scan flop, included in the second clock domain, the scan chain signal from the second test input node to a second test output node. As described above, the scan-chain pattern may be shifted from scan flop 320*g* in IC 305*b* to scan flops 320*i*-320*l*, via test output node 355*c* and test output pin 356*b* in IC 305*b*, to test input pin 350*e* in IC 305*c* that is coupled to an input terminal of scan flop 320*i*. Accordingly, the scan-chain pattern crosses into a third clock domain at the die boundary between IC 305*b* and IC 305*c*.

At 620, method 600 proceeds with enabling, at the first point in time, a different lockup latch to increase the propagation delay of the scan chain signal from the second test output node to the third test input node that is coupled to an input terminal of a different scan flop in a third clock domain. In a similar manner as described above, lockup latch 315*c* may be enabled, via an assertion of enable signal 330*c*, to compensate for a lag from a signal on input clock pin 307*b* to a signal on input clock pin 307*c*. The enabling of lockup latch 315*c* thereby delaying a propagation of the scan-chain pattern from test output node 355*c* in IC 305*b* to test input pin 350*e* in IC 305*c*. Such a delay may help to prevent a setup timing violation for scan flop 320*i*.

Method 600 continues at 630 with disabling, at the second point in time, the different lockup latch to decrease a propagation delay of the scan chain signal from the second test output node to a third test input node. At the second point in time, test equipment 370 may shift a phase of the signal on input clock pin 307*c* as compared to a signal on input clock pin 307*b*, thereby changing a skew between the two clock signals. In response, lockup latch 315*c* is disabled by de-asserting enable signal 330*c*. The removal of the propagation delay may aid in avoiding a setup timing violation for scan flop 320*i*.

The selective enabling and disabling of lockup latch 315*c* may be performed based on a clock skew between signals on input clock pins 307*b* and 307*c*. It is noted that enabling and disabling of lockup latches 315*c* and lockup latch 315*d* (described above in regards to method 500), may be performed independently. As described, lockup latch 315*d* in IC 305*b* may be selectively enabled based on a skew between signals on input clock pins 307*b* and 307*a*. Such independent selectivity for enabling the plurality of lockup latches 315 in ICs 305 may enable test equipment 370 to set to various frequencies and/or phase shifts for signals on input clock pins 307*a* and 307*b* at different points in time. This variability may help to increase a level of test coverage when ICs 305 are under test. The selective enabling of lockup latches 315 may, therefore, contribute to the testability of ICs 305.

It is noted that method 600 includes blocks 610-630. Method 600 may end in block 630 or may repeat some or all blocks of the method. For example, method 600 may repeat 610 to shift a scan-chain pattern through scan flops 320 after enable signal 330c has been either asserted or de-asserted. As described above, methods 400, 500, and 600 may be performed concurrently, for example, to manage a plurality of scan chains being shifted in parallel.

Figure 7:
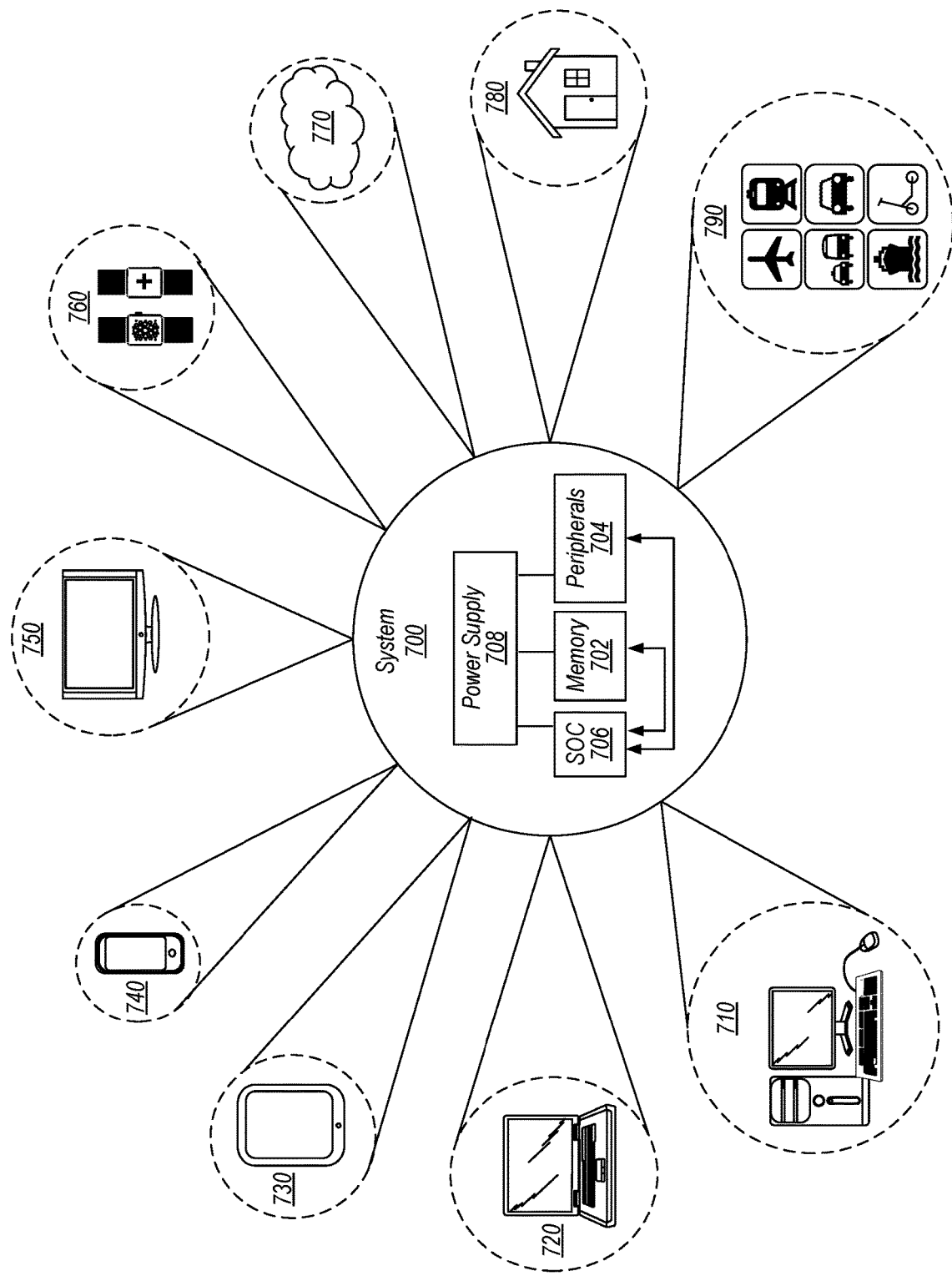
FIG. 7 depicts various embodiments of systems that include integrated circuits that utilize the disclosed techniques.

FIGS. 1-6 illustrate circuits and methods for a system, such as an integrated circuit, that include scan chains with lockup latch circuits. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit, including multi-die packages. A block diagram illustrating an embodiment of system 700 is illustrated in FIG. 7. System 700 may, in some embodiments, include any disclosed embodiment of systems disclosed herein, such as systems 100 and 300 shown in FIGS. 1 and 3.

In the illustrated embodiment, the system 700 includes at least one instance of a system on chip (SoC) 706 which may include multiple types of processor circuits, such as a central processing unit (CPU), a graphics processing unit (GPU), or otherwise, a communication fabric, and interfaces to memories and input/output devices. SoC 706 may correspond to an instance of the SoCs disclosed herein. In various embodiments, SoC 706 is coupled to external memory circuit 702, peripherals 704, and power supply 708.

A power supply 708 is also provided which supplies the supply voltages to SoC 706 as well as one or more supply voltages to external memory circuit 702 and/or the peripherals 704. In various embodiments, power supply 708 represents a battery (e.g., a rechargeable battery in a smart phone, laptop or tablet computer, or other device). In some embodiments, more than one instance of SoC 706 is included (and more than one external memory circuit 702 is included as well).

External memory circuit 702 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 702 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 760 are contemplated as well, such as devices worn around the neck, devices attached to hats or other headgear, devices that are implantable in the human body, eyeglasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home 780 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation 790. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise.

It is noted that the wide variety of potential applications for system 700 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 7 are illustrative only and are not intended to be limiting. Other devices are possible and are contemplated.

As disclosed in regards to FIG. 7, system 700 may include one or more integrated circuits included within a personal computer, smart phone, tablet computer, or other type of computing device. A process for designing and producing an integrated circuit using design information is presented below in FIG. 8.

Figure 8:
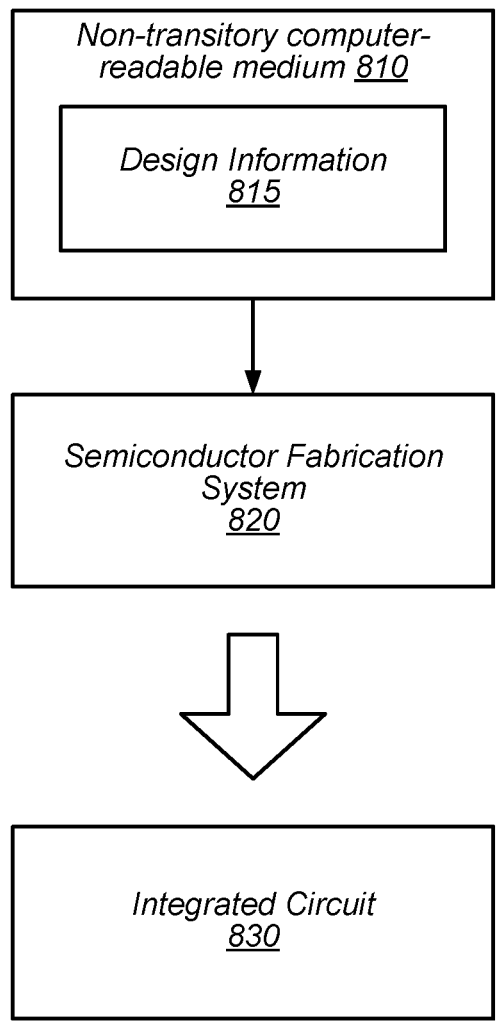
FIG. 8 is a block diagram of an example computer-readable medium, according to some embodiments.

FIG. 8 is a block diagram illustrating an example of a non-transitory computer-readable storage medium that stores circuit design information, according to some embodiments. The embodiment of FIG. 8 may be utilized in a process to design and manufacture integrated circuits, for example, including one or more instances of systems (or portions thereof) 100 and 300 as shown in FIGS. 1 and 3. In the illustrated embodiment, semiconductor fabrication system 820 is configured to process the design information 815 stored on non-transitory computer-readable storage medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system, such as semiconductor fabrication system 820, for example. In some embodiments, design information 815 may include a netlist that specifies elements of a cell library, as well as their connectivity. One or more cell libraries used during logic synthesis of circuits included in integrated circuit 830 may also be included in design information 815. Such cell libraries may include information indicative of device or transistor level netlists, mask design data, characterization data, and the like, of cells included in the cell library.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown or described herein. Further, integrated circuit 830 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus comprising:
a first set of scan-enabled flip-flop circuits configured to shift a scan-chain pattern from a first test input node to a first test output node using a first clock signal;
a particular lockup latch coupled to the first test output node and to a second test input node, and configured to, when enabled, delay propagation of the scan-chain pattern from the first test output node to the second test input node;
a second set of scan-enabled flip-flop circuits configured to shift the scan-chain pattern from the second test input node to a second test output node using a second clock signal, different from the first clock signal;
a different lockup latch coupled to the second test output node and to a third test input node, and configured to, when enabled, delay propagation of the scan-chain pattern from the second test output node to the third test input node; and
a control circuit configured to determine whether to enable the particular lockup latch using a particular scan test signal.

2. The apparatus of claim 1, wherein the control circuit is further configured to enable the particular lockup latch based on a determination that the second clock signal lags the first clock signal.

3. The apparatus of claim 1, wherein the control circuit is further configured to:
determine whether to enable the different lockup latch using the particular scan test signal; and prevent the particular lockup latch and the different lockup latch from being enabled concurrently.

4. The apparatus of claim 1, further comprising a third set of scan-enabled flip-flop circuits configured to shift the scan-chain pattern from the third test input node to a third test output node using the first clock signal.

5. The apparatus of claim 4, further comprising an encapsulating package, wherein the first test input node and the third test output node are coupled to respective pins of the encapsulating package; and
wherein, the second and third test input nodes and the first and second test output nodes are not coupled to pins of the encapsulating package.

6. The apparatus of claim 5, wherein the first and second clock signals are received from respective pins of the encapsulating package.

7. The apparatus of claim 1, wherein the particular lockup latch is further configured to, when enabled, delay propagation of the scan-chain pattern for less than one clock cycle.

8. The apparatus of claim 1, wherein the particular lockup latch includes a latching circuit and a multiplexing circuit;
wherein to enable the particular lockup latch, the control circuit is configured to select a first input of the multiplexing circuit that is coupled to the latching circuit; and
wherein to disable the particular lockup latch, the control circuit is configured to select a second input of the multiplexing circuit that is coupled to the first test output node.

9. A method comprising:
shifting, through a particular set of scan-enabled flip-flop circuits included in a first clock domain of a circuit, a scan-chain pattern from a first test input pin to a first test output node;
enabling, at a first point in time, a particular lockup latch to increase a propagation delay of the scan-chain pattern from the first test output node to a second test input node that is coupled to an input terminal of a given scan-enabled flip-flop circuit in a second clock domain of the circuit;
shifting, through a different set of scan-enabled flip-flop circuits included in the second clock domain, including the given scan-enabled flip-flop circuit, the scan-chain pattern from the second test input node to a second test output node, wherein a different lockup latch couples the second test output node to a third test input node that is coupled to an input terminal of a given scan-enabled flip-flop circuit in the first clock domain; and
disabling, at a second point in time, the particular lockup latch to decrease the propagation delay of the scan-chain pattern from the first test output node to the second test input node;
wherein the enabling and disabling are performed based on a clock skew between the first clock domain and the second clock domain.

10. The method of claim 9, further comprising preventing the particular lockup latch and the different lockup latch from being enabled concurrently.

11. The method of claim 10, further comprising enabling, at the second point in time, the different lockup latch to increase a propagation delay of the scan-chain pattern from the second test output node to the third test input node.

12. The method of claim 10, further comprising disabling, at the first point in time, the different lockup latch to reduce a propagation delay of the scan-chain pattern from the second test output node to the third test input node.

13. The method of claim 9, wherein the increase in the propagation delay of the scan-chain pattern through the particular lockup latch when enabled is less than one clock cycle of the first clock domain.

14. The method of claim 9, further comprising supplying, by a test circuit, the scan-chain pattern to the first test input pin, a first clock signal to the first clock domain and a second clock signal to the second clock domain.

15. A system comprising:
a first integrated circuit (IC) including:
a first set of scan-enabled flip-flop circuits configured to shift a scan-chain pattern from a first test input pin to a first test output node;
a first input clock pin coupled to ones of the first set of scan-enabled flip-flop circuits; and
a first lockup latch coupled to the first test output node and to a first test output pin, and configured to, when enabled, delay propagation of the scan-chain pattern from the first test output node to the first test output pin; and
a second IC including:
a second set of scan-enabled flip-flop circuits configured to shift the scan-chain pattern from a second test input pin to a second test output node;
a second input clock pin coupled to ones of the second set of scan-enabled flip-flop circuits; and
a second lockup latch coupled to the second test output node and to a second test output pin, and configured to, when enabled, delay propagation of the scan-chain pattern from the second test output node to the second test output pin; and
wherein the first test output pin is coupled to the second test input pin.

16. The system of claim 15, wherein the first IC further includes a third set of scan-enabled flip-flop circuits configured to shift the scan-chain pattern from a third test input pin to a third test output pin; and
wherein the first input clock pin is coupled to ones of the third set of scan-enabled flip-flop circuits.

17. The system of claim 15, further comprising an encapsulating package, wherein the first and second ICs are included in the encapsulating package; and
wherein the first and second input clock pins and the first test input pin are coupled to respective pins of the encapsulating package; and
wherein, the first and second test output pins and the second test input pin are not coupled to pins of the encapsulating package.

18. The system of claim 17, further comprising an interposer die included in the encapsulating package and includes a first conductive trace from the first test output pin to the second test input pin.

19. The system of claim 15, wherein the first IC further includes a particular control circuit configured to determine whether to enable the first lockup latch based on a clock skew between respective clock signals on the first and second input clock pins.

20. The system of claim 19, wherein the second IC further includes a different control circuit configured to determine whether to enable the second lockup latch based on the clock skew between the respective clock signals on the first and second input clock pins, and wherein the first and second lockup latches are not enabled concurrently.

* * * * *